(12) United States Patent
Park et al.

(10) Patent No.: US 8,619,151 B2
(45) Date of Patent: Dec. 31, 2013

(54) PHOTOGRAPHING METHOD AND APPARATUS PROVIDING CORRECTION OF OBJECT SHADOWS, AND A RECORDING MEDIUM STORING A PROGRAM FOR EXECUTING THE METHOD

(75) Inventors: Ju-hee Park, Suwon-si (KR); Young-hoon Jeong, Suwon-si (KR); Jae-min Lee, Suwon-si (KR); Il-do Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/878,131

(22) Filed: Sep. 9, 2010

(65) Prior Publication Data

US 2011/0187898 A1    Aug. 4, 2011

(30) Foreign Application Priority Data

Jan. 29, 2010   (KR) .................. 10-2010-0008600

(51) Int. Cl.
*H04N 5/235*   (2006.01)
*H04N 5/228*   (2006.01)

(52) U.S. Cl.
USPC ...................................................... 348/222.1

(58) Field of Classification Search
USPC ............ 348/222.1, 241, 251, 333.01, 333.02, 348/333.05, 333.11, 333.12
See application file for complete search history.

(56) References Cited

U.S. PATENT DOCUMENTS

| | | | |
|---|---|---|---|
| 6,246,793 B1 * | 6/2001 | Rindtorff et al. | 382/174 |
| 7,271,838 B2 * | 9/2007 | Suekane et al. | 348/333.02 |
| 8,023,015 B2 * | 9/2011 | Chung et al. | 348/255 |
| 8,072,516 B2 * | 12/2011 | Park et al. | 348/254 |
| 2003/0174235 A1 * | 9/2003 | Barkan et al. | 348/362 |
| 2008/0074517 A1 * | 3/2008 | Chung et al. | 348/255 |
| 2009/0128578 A1 * | 5/2009 | Feng | 345/600 |
| 2010/0033588 A1 * | 2/2010 | Thorn | 348/222.1 |

* cited by examiner

*Primary Examiner* — Nicholas Giles
(74) *Attorney, Agent, or Firm* — Sughrue Mion, PLLC

(57) ABSTRACT

A photographing method and apparatus are provided. In the method, an image signal of an object region is detected from an input image signal, a shadow region is detected from the object region image signal, and an image signal obtained by superimposing the shadow region on the object region image signal is displayed. When removal of a shadow is requested after the input image signal is captured, the photographing method corrects a brightness level of the shadow region. The photographing apparatus includes an object region detecting unit configured to detect an image signal of an object region from an image signal; a shadow region detecting unit configured to detect a shadow region from the object region image signal, and an image signal superimposing unit configured to output an image signal detected by superimposing the shadow region detected by the shadow region detecting unit onto the object region image signal detected by the object region detecting unit.

18 Claims, 8 Drawing Sheets

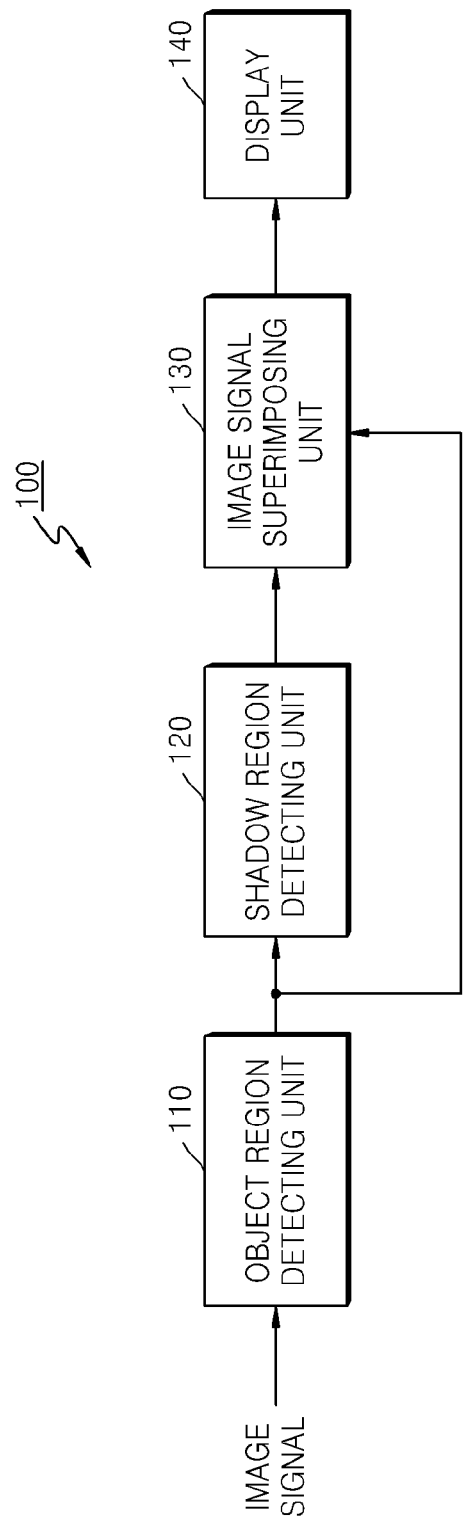

FIG. 3A
 X  X BRIGHTNESS LEVEL EQUAL TO OR LOWER THAN AVERAGE BRIGHTNESS LEVEL OF OBJECT REGION
FIG. 3B

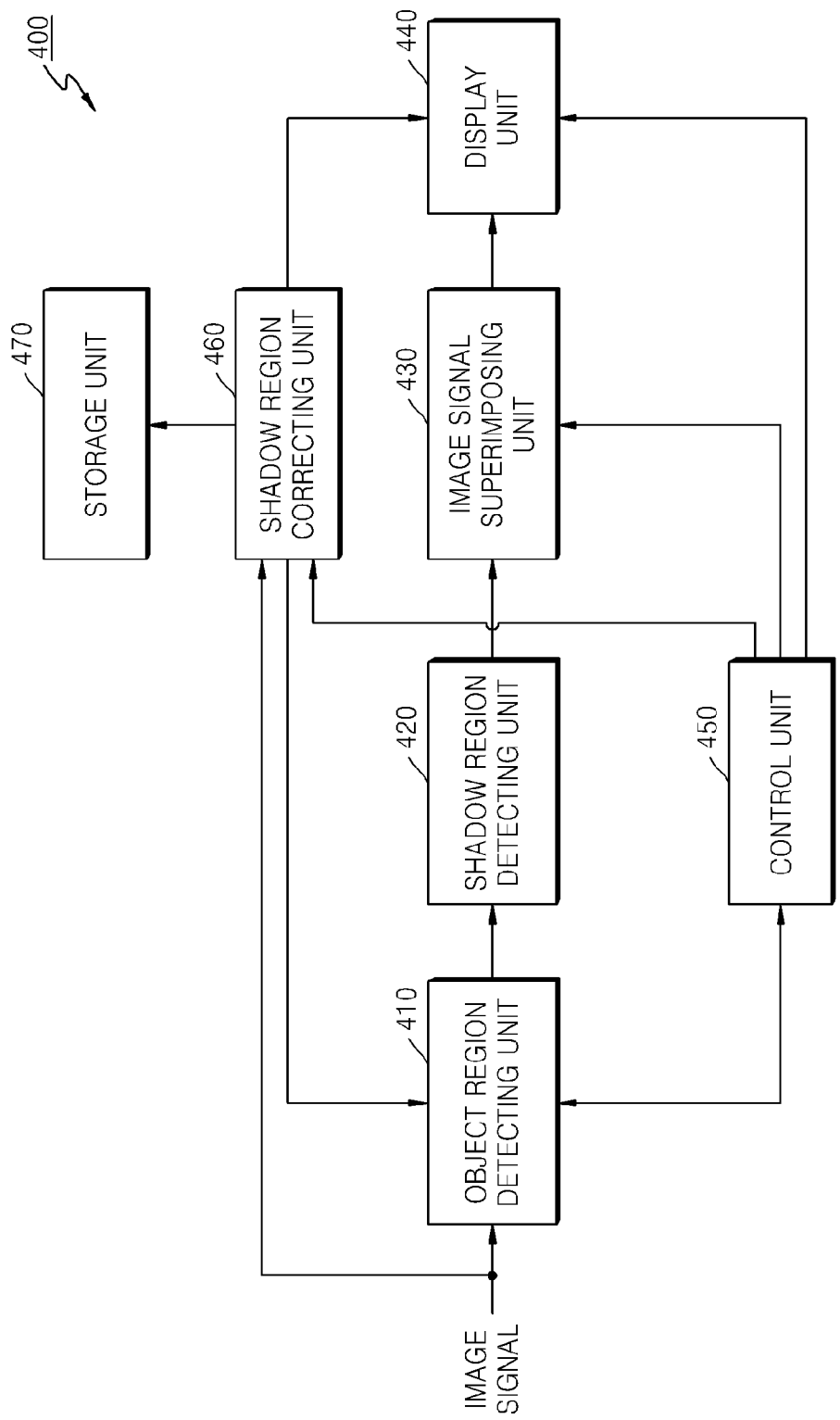

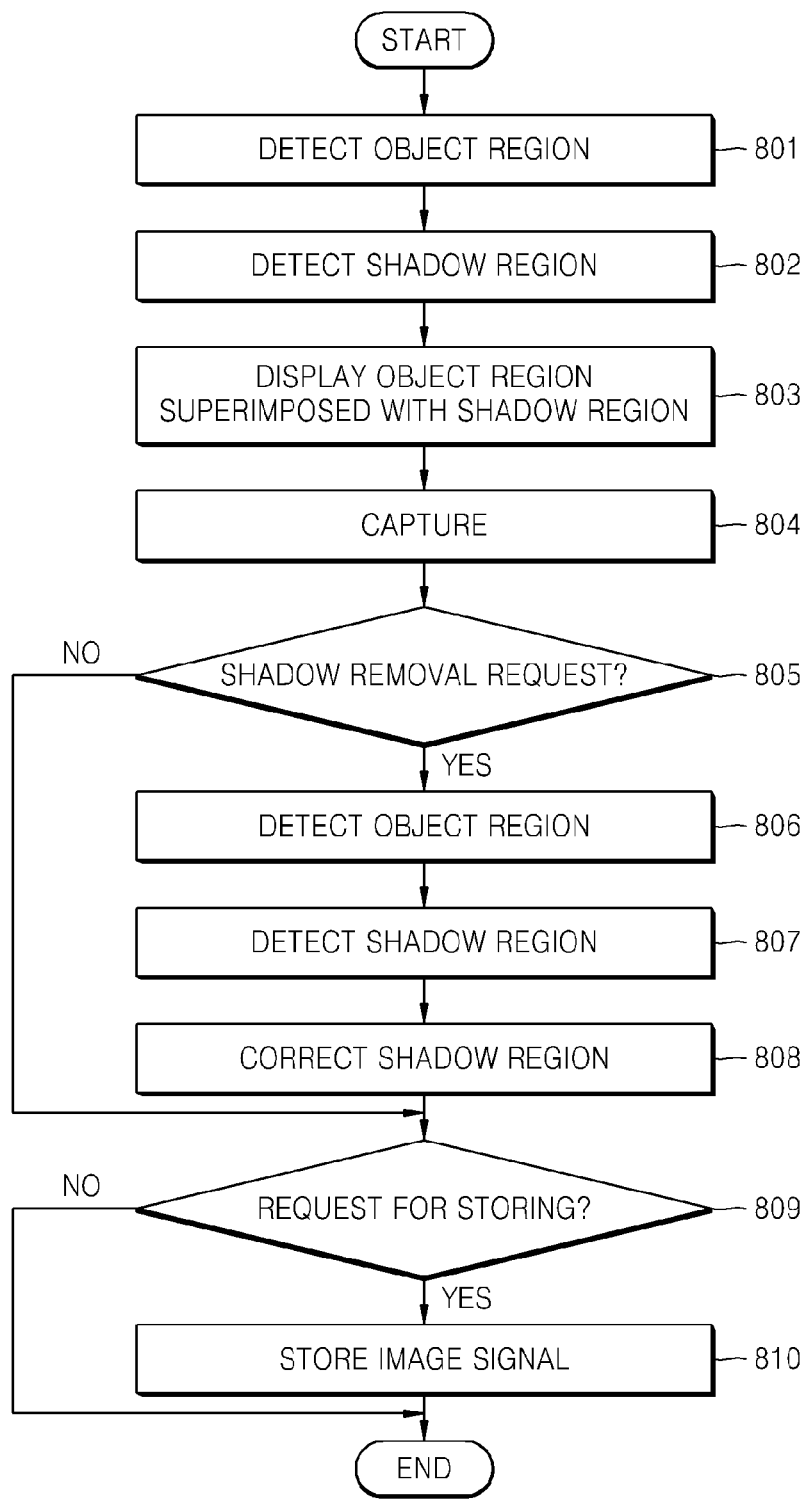

PHOTOGRAPHING METHOD AND APPARATUS PROVIDING CORRECTION OF OBJECT SHADOWS, AND A RECORDING MEDIUM STORING A PROGRAM FOR EXECUTING THE METHOD

CROSS-REFERENCE TO RELATED APPLICATIONS

This application claims priority from of Korean Patent Application No. 10-2010-0008600, filed on Jan. 29, 2010, in the Korean Intellectual Property Office, the disclosure of which is incorporated herein in its entirety by reference.

BACKGROUND

1. Field

The exemplary embodiments relate to photography, and more particularly, to a photographing method and apparatus providing correction of object shadows, and a recording medium storing a program for executing the method.

2. Description of the Related Art

When taking pictures of an object using a photographing apparatus such as a digital camera, a digital video camera, a surveillance camera, or a cellular phone having a camera function, the quality of the pictures may be affected due to a shadow on the object varying according to the direction of light.

Particularly, when taking a picture of a face, the face of the picture may be partially shaded according to the direction of light and the shape of the face. Such partial shading may not be removed by post-correction, such as white balance correction.

Therefore, a function for correcting shading of an object may be necessary for a photographing apparatus. Particularly, if a user taking a picture of an object using a cellular phone in camera mode is not skilled in methods of taking pictures according to the direction of light, although a high-quality beauty mode is selected, the quality of the picture may be poor due to presence of a shadow on the object.

SUMMARY

The exemplary embodiments provide a photographing method and apparatus providing correction of object shadows, and a recording medium storing a program for executing the method.

According to an aspect of the exemplary embodiments, there is provided a photographing method including: detecting an image signal of an object region from an input image signal; detecting a shadow region from the object region image signal; and displaying an image signal detected by superimposing the shadow region on the object region of the image signal.

If removal of a shadow is requested after the input image signal is captured, the photographing method may further include correcting a brightness level of the shadow region.

The correcting of the brightness level of the shadow region may be performed a plurality of times by newly detecting an object region from a previously corrected image signal, newly detecting a shadow region from the newly detected object region, and correcting a brightness level of the newly detected shadow region.

The correcting of the brightness level of the shadow region may be performed using a gamma curve determined according to a brightness level of the object region of the image signal.

The photographing method may further include storing the image signal having a corrected shadow region.

The detecting of the shadow region may include: detecting a blur image signal from the object region image signal; detecting a skin tone mask of the object region from the blur image signal; detecting a shadow region mask by using the blur image signal, the skin tone mask, and an average brightness level of the object region; and outputting the shadow region mask as the shadow region.

The detecting of the blur image signal may be performed using a low pass filter; the detecting of the skin tone mask may be performed using an RGB (red-green-blue) filter threshold algorithm; and the detecting of the shadow region mask may be performed by detecting a region having a brightness level equal to or lower than the average brightness level of the object region, as a shadow region.

In the detecting of the shadow region mask, the shadow region mask may be detected by performing an intersection calculation on the blur image signal, the skin tone mask, and the brightness level equal to or lower than the average brightness level.

According to another aspect of the exemplary embodiments, there is provided a photographing apparatus including: an object region detecting unit configured to detect an image signal of an object region from an image signal; a shadow region detecting unit configured to detect a shadow region from the object region image signal; an image signal superimposing unit configured to output an image signal detected by superimposing the shadow region detected by the shadow region detecting unit onto the object region image signal detected by the object region detecting unit, and a display unit configured to display the image signal superimposed by the image signal superimposing unit.

The photographing apparatus may further include a shadow region correcting unit configured to correct a brightness level of the shadow region detected by the shadow region detecting unit after the image signal is captured.

The shadow region correcting unit may perform shadow region correction a plurality of times by transmitting an image signal, the shadow region of which is corrected, to the object region detecting unit so as to newly detect an object region and a shadow region from the corrected image signal and re-correct a shadow of the corrected image signal based on the newly detected object region and shadow region.

The shadow region correcting unit may correct the shadow according to a gamma curve determined by a brightness level of the object region.

The photographing apparatus may further include a storage unit configured to store the image signal, where the shadow region has been corrected.

The object region may be a face region, and the shadow region detecting unit may be configured to detect a blur image signal from the object region image signal, detect a skin tone mask from the blur image signal, detect a shadow region mask by using the blur image signal, the skin tone mask, and an average brightness level of the object region, and outputs the shadow region mask as the shadow region.

The shadow region detecting unit may detect the blur image signal by using a low pass filter, detect the skin tone mask by using an RGB filter threshold algorithm, and detect a region having a brightness level equal to or lower than the average brightness level of the object region as the shadow region.

The shadow region detecting unit may detect the shadow region mask by performing an intersection calculation on the blur image signal, the skin tone mask, and the brightness level equal to or lower than the average brightness level.

According to another aspect of the present invention, there is provided a recording medium storing a computer program for executing the photographing method.

BRIEF DESCRIPTION OF THE DRAWINGS

The above and other features and advantages of the exemplary embodiments will become more apparent by describing in detail the exemplary embodiments with reference to the attached drawings in which:

FIG. 1 is a functional block diagram illustrating a photographing apparatus according to an exemplary embodiment;

FIGS. 3A and 3B are views illustrating an example of detecting a shadow region mask from an object region.

FIG. 4 is a functional block diagram illustrating a photographing apparatus according to another exemplary embodiment;

FIG. 8 is a flowchart for explaining a photographing method according to another exemplary embodiment.

DETAILED DESCRIPTION

Figure 2A:
FIGS. 2A through 2C are views illustrating an example of detecting a skin tone mask from an object region.

The exemplary embodiments will now be described more fully with reference to the accompanying drawings, in which exemplary embodiments are shown.

FIG. 1 is a functional block diagram illustrating a photographing apparatus 100 according to an exemplary embodiment. Photographing apparatus 100 may be a digital camera, a digital video camera, a surveillance camera, a cellular phone having a camera function, or a photographing apparatus connectable to a computer. However, photographing apparatus 100 is not limited thereto.

Referring to FIG. 1, photographing apparatus 100 includes an object region detecting unit 110, a shadow region detecting unit 120, an image signal superimposing unit 130, and a display unit 140.

When an image signal is input before an image of an object is captured, object region detecting unit 110 detects an object region from the input image signal. The object region may be a face region. In this case, one of conventional face region detecting methods may be used. For example, a face region may be detected from the input image signal by detecting the position of a face from the image signal, using characteristic edges such as eyes, a nose, and a mouth; detecting the contour of the face including the eyes, the nose, and the mouth, and calculating the brightness in the contour of the face. However, the exemplary embodiments are not limited to such a method. The input image signal may be detected by receiving light reflected from the object by using an image pickup optical system (not shown), transmitting the light to an image pickup device (not shown), and converting the light into an electric signal. However, the input image signal may be detected by using other methods. In addition, object region detecting unit 110 may detect an average brightness level of the detected object region and transmit the average brightness level to shadow region detecting unit 120.

Figure 2B:
Figure 2C:

When shadow region detecting unit 120 receives an image signal of the object region and the average brightness level from the object region detecting unit 110, shadow region detecting unit 120 detects a shadow region from the object region. That is, shadow region detecting unit 120 detects a skin tone mask of the object region. FIGS. 2A through 2C are views illustrating an example of detecting a skin tone mask from an object region. Referring to FIGS. 2A through 2C, when an image signal of an object region as shown in FIG. 2A is received, shadow region detecting unit 120 detects a blur image signal from the object region image signal by using a low pass filter as shown in FIG. 2B. Reference numeral 201 in FIG. 2A denotes a shadow region.

Next, the shadow region detecting unit 120 detects a skin tone mask of the object region as shown in FIG. 2C from the blur image signal of FIG. 2B by using a red-green-blue (RGB) filter threshold algorithm. For example, by using an RGB filter threshold algorithm having conditions of R>(95+Y), G>(40+Y), B>(20+Y), |R−G|>15, R>G, and R>B, the shadow region detecting unit 120 may detect a skin tone mask as shown in FIG. 2C.

Shadow region detecting unit 120 detects a shadow region using the blur image signal of FIG. 2B, skin tone mask of FIG. 2C, and the average brightness level of the object region. FIGS. 3A and 3B are views illustrating an example of detecting a shadow region from an object region. As shown in FIG. 3A, shadow region detecting unit 120 performs an intersection calculation on the blur image signal, the skin tone mask, and a brightness level equal to or lower than the average brightness level, so as to detect a shadow region mask as shown in FIG. 3B. Information about the detected shadow region mask is transmitted as a detected shadow region to image signal superimposing unit 130. A part of the object region having a brightness level equal to or lower than the average brightness level of the object region is detected as a shadow region.

Image signal superimposing unit 130 superimposes the shadow region detected by shadow region detecting unit 120 onto the image signal of the object region detected by object region detecting unit 110. Then, display unit 140 displays the image signal of the object region including the shadow region. Thus, a user can see the image signal of the object region including the shadow region displayed by display unit 140 to determine whether to take a picture or change the photographing angle in consideration of the shadow region. Display unit 140 may display an image signal corresponding to the input image signal. The image signal displayed by display unit 140 may be the image signal of the object region including the shadow region.

FIG. 4 is a functional block diagram illustrating a photographing apparatus 400 according to another embodiment of the present invention. Photographing apparatus 400 may be a digital camera, a digital video camera, a surveillance camera, a cellular phone having a camera function, or a photographing apparatus connectable to a computer. However, photographing apparatus 400 is not limited thereto.

Photographing apparatus 400 includes an object region detecting unit 410, a shadow region detecting unit 420, an image signal superimposing unit 430, a display unit 440, a control unit 450, a shadow region correcting unit 460, and a storage unit 470.

Object region detecting unit 410, shadow region detecting unit 420, image signal superimposing unit 430, and display unit 440 illustrated in FIG. 4 have the same structures and operate in the same manners as object region detecting unit 110, shadow region detecting unit 120, image signal superimposing unit 130, and display unit 140 illustrated in FIG. 1. Thus, descriptions thereof will not be repeated here.

Control unit 450 controls the overall operation of photographing apparatus 400. When photographing apparatus 400 is powered on or manipulated for performing a photographing operation, control unit 450 may control object region detecting unit 410, shadow region detecting unit 420, image signal superimposing unit 430, and display unit 440 so that they can operate like object region detecting unit 110, shadow region detecting unit 120, image signal superimposing unit 130, and display unit 140 to display an object image signal including a shadow region, or an image signal including the object image signal including the shadow region.

In a state where the object image signal including the shadow region is displayed by display unit 440, an image is captured, and if a user requests removal of a shadow, control unit 450 may provide information about the brightness level of an object region detected by object region detecting unit 410 to shadow region correcting unit 460. The brightness level information of the object region is brightness level information corresponding to a skin tone. At this time, control unit 450 may provide position information of the object region detected by object region detecting unit 410 and position information of the shadow region detected by the shadow region detecting unit 420 to shadow region correcting unit 460. Alternatively, the position information of the object region and the shadow region, and the brightness level information may be transmitted to shadow region correcting unit 460 from object region detecting unit 410 and shadow region detecting unit 420.

By using a gamma curve determined by the brightness level information of the object region, the position information of the object region, and the position information of the shadow region, shadow region correcting unit 460 selects a shadow region from an input image signal and corrects the brightness level of the selected shadow region. Here, the input image signal is an image signal of the captured image. Such correction of the shadow region may be repeated at least twice. This repetition may be carried out under the control of the control unit 450 in response to a user's request.

Figure 5A:
FIGS. 5A through 5C are views illustrating an example of correcting a shadow region.
Figure 5B:
Figure 5C:

FIGS. 5A through 5C are views illustrating an example of correcting a shadow region twice. A shadow region of an input image signal shown in FIG. 5A is corrected once by shadow region correcting unit 460. As a result, an image signal shown in FIG. 5B may be detected. To re-correct the corrected image signal of FIG. 5B, shadow region correcting unit 460 transmits the corrected image signal to object region detecting unit 410. Then, object region detecting unit 410 newly detects an object region from the corrected image signal, and shadow region detecting unit 420 newly detects a shadow region from the newly detected object region.

Thereafter, shadow region detecting unit 420 transmits position information of the newly detected shadow region to shadow region correcting unit 460. At this time, the position information of the newly detected shadow region may be transmitted to shadow region correcting unit 460 through control unit 450. By using the position information of the newly detected shadow region, shadow region correcting unit 460 corrects the brightness level of the image signal of FIG. 5B, the previous shadow region, which has been corrected. As a result, a re-corrected image signal can be detected as shown in FIG. 5C. The re-corrected image signal may be displayed by display unit 440 and stored in storage unit 470 under the control of control unit 450. By correcting a shadow region of a captured image in this way, the brightness level of an object region of the captured image may become uniform. In the example shown in FIGS. 5A through 5C, the brightness level of an object region of a captured image is corrected to be uniform by performing shadow region correction twice. However, such shadow region correction may be performed two or more times.

Figure 6:
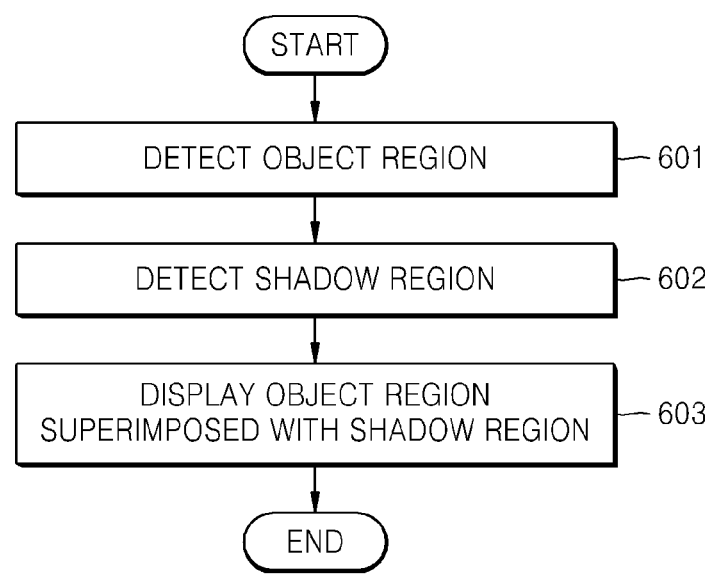
FIG. 6 is a flowchart for explaining a photographing method according to an exemplary embodiment.

FIG. 6 is a flowchart for explaining a photographing method according to an exemplary embodiment. Referring to FIG. 6, an object region is detected from an image signal which is input before an image is actually captured (operation 601). The object region may be a face region. In this case, the object region may be detected as explained in FIG. 1. The image signal may be input as explained in relation to FIG. 1.

After detecting the object region, a shadow region is detected from the detected object region (operation 602). As described above, the shadow region may be detected as explained in shadow region detecting unit 120 shown in FIG. 1 by detecting a blur image signal from the input image signal, detecting a skin tone mask from the blur image signal, and detecting a shadow region mask using the blur image signal, the skin tone mask, and an average brightness level of the object region. The shadow region mask is the shadow region.

Next, an object image on which the detected shadow region is superimposed is displayed by display unit 140 (operation 603). An image corresponding to the input image signal may be displayed by display unit 140. The image corresponding to the input image signal is an image on which the detected shadow region is superimposed.

Since an image on which a shadow region is superimposed is displayed before an image is captured, a user can determine whether to capture an image based on the displayed image, and thus an image can be captured in consideration of a shadow. For example, while seeing a shadow region, a user can change the photographing angle. Alternatively, a shadow region of a captured image can be corrected.

Figure 7:
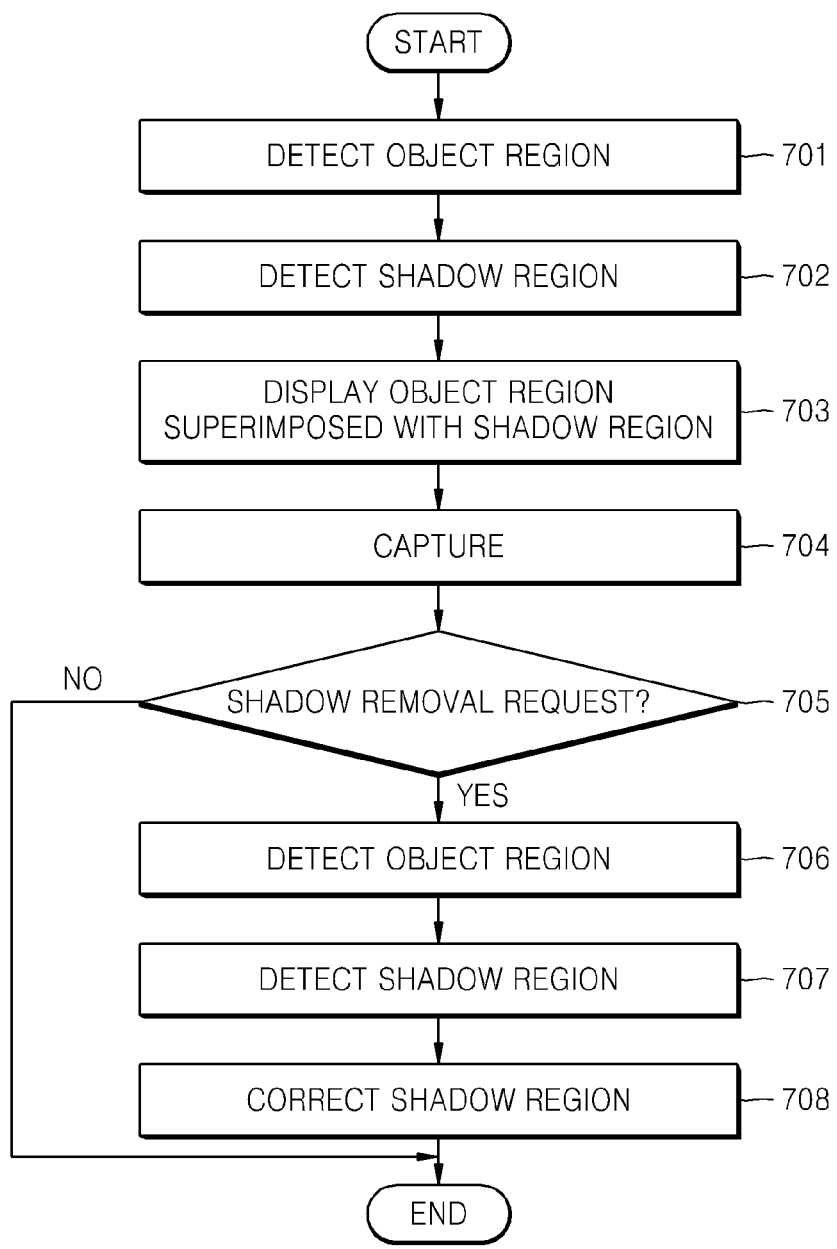
FIG. 7 is a flowchart for explaining a photographing method according to another exemplary embodiment.

FIG. 7 is a flowchart for explaining a photographing method according to another exemplary embodiment. Referring to FIG. 7, operations 701 through 703 are commensurate with operations 601 through 603. Thus, descriptions of operations 701 through 703 will not be repeated here.

An object image on which a shadow region is superimposed, or an image signal including the object image is captured (operation 704). If removal of a shadow is requested (operation 705), an object region is detected from the captured image signal like in operation 701 (operation 706), and a shadow region is detected from the detected object region like in operation 702 (operation 707).

Next, by using a gamma curve determined by the brightness level of the detected object region, position information of the object region, and position information of the shadow region, the brightness level of the shadow region of the captured image signal is corrected (operation 708). If performing shadow region correction one or more times on the corrected image signal is requested, an object region is newly detected from the corrected image signal, and a shadow region is newly detected from the newly detected object region. Then, the brightness level of the corrected image signal is re-corrected using the newly detected shadow region.

FIG. 8 is a flowchart for explaining a photographing method according to another exemplary embodiment. Referring to FIG. 8, operations 801 through 808 are commensurate with operations 701 through 708, and thus descriptions thereof will not be repeated here.

If it is requested to store an image signal, the shadow region of which is corrected (operation 809), the image signal is stored (operation 810). By doing this, an image signal with a corrected shadow region is stored as a captured image. Because of this, a brighter image can be captured without excessive exposure, and an image signal can be captured, which has a uniform brightness level in its object region.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the apparatus can include a processor or microprocessor executing a computer program stored in a computer-readable medium, such as a local storage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing method comprising:
    detecting an object region image signal from an input image signal;
    detecting a shadow region from the object region image signal; and
    displaying an image signal detected by superimposing the shadow region on the object region image signal,
    wherein the detecting the object region image signal, the detecting the shadow region from the object region image signal, and the displaying the image signal detected by superimposing the shadow region of the object region image signal are all performed before an image of an object is captured,
    wherein the detecting of the shadow region comprises:
    detecting a blur image signal from the object region image signal;
    detecting a skin tone mask of the object region from the blur image signal;
    detecting a shadow region mask by using the blur image signal, the skin tone mask, and an average brightness level of the object region; and
    outputting the shadow region mask as the shadow region.

2. The photographing method of claim 1, wherein when removal of a shadow is requested after the image of the object is captured, the photographing method further comprises correcting a brightness level of the shadow region.

3. The photographing method of claim 2, wherein the correcting of the brightness level of the shadow region is performed a plurality of times by newly detecting an object region from a previously corrected image signal, newly detecting a shadow region from the newly detected object region, and correcting a brightness level of the newly detected shadow region.

4. The photographing method of claim 3, wherein the correcting of the brightness level of the shadow region is performed using a gamma curve determined according to a brightness level of the object region.

5. The photographing method of claim 2, further comprising storing the image of the object, in which the shadow region has been corrected.

6. A photographing method comprising:
    detecting an object region image signal from an input image signal;
    detecting a shadow region from the object region image signal; and
    displaying an image signal detected by superimposing the shadow region on the object region image signal,
    detecting a blur image signal from the object region image signal;
    detecting a skin tone mask of the object region from the blur image signal;
    detecting a shadow region mask by using the blur image signal, the skin tone mask, and an average brightness level of the object region; and
    outputting the shadow region mask as the shadow region.

7. The photographing method of claim 6, wherein the detecting of the blur image signal is performed using a low pass filter;
    the detecting of the skin tone mask is performed using an RGB (red-green-blue) filter threshold algorithm; and
    the detecting of the shadow region mask is performed by detecting a region having a brightness level equal to or lower than the average brightness level of the object region as a shadow region.

8. The photographing method of claim 7, wherein in the detecting of the shadow region mask, the shadow region mask is detected by performing an intersection calculation on the blur image signal, the skin tone mask, and the brightness level equal to or lower than the average brightness level.

9. A non-transitory recording medium storing a computer program, wherein the program, when executed by a computer processor causes the computer processor to execute the photographing method of claim 1.

10. A photographing apparatus comprising:
    an object region detecting unit which detects an object region image signal from an image signal;
    a shadow region detecting unit which detects a shadow region from the object region image signal; and
    an image signal superimposing unit which outputs an image signal detected by superimposing the shadow region detected by the shadow region detecting unit onto the object region image signal detected by the object region detecting unit,
    wherein the detecting the object region image signal, the detecting the shadow region from the object region image signal, and the displaying the image signal detected by superimposing the shadow region of the object region image signal are all performed before an image of an object is captured,
    wherein the shadow region detecting unit detects a blur image signal from the object region image signal, detects a skin tone mask from the blur image signal, detects a shadow region mask by using the blur image signal, the skin tone mask, and an average brightness level of the object region, and outputs the shadow region mask as the shadow region.

11. The photographing apparatus of claim 10, further comprising a display unit which displays the image signal superimposed by the image signal superimposing unit.

12. The photographing apparatus of claim 11, further comprising a shadow region correcting unit which corrects a brightness level of the shadow region detected by the shadow region detecting unit after the image of the object is captured.

13. The photographing apparatus of claim 12, wherein the shadow region correcting unit performs shadow region correction a plurality of times by transmitting an image signal having a corrected shadow region, to the object region detecting unit so as to newly detect an object region and a shadow region from the corrected image signal and re-correct a shadow of the corrected image signal based on the newly detected object region and shadow region.

14. The photographing apparatus of claim 13, wherein the shadow region correcting unit corrects the shadow according to a gamma curve determined by a brightness level of the object region.

15. The photographing apparatus of claim 12, further comprising a storage unit which stores the image of the object, the shadow region of which is corrected.

16. A photographing apparatus comprising:
an object region detecting unit which detects an object region image signal from an image signal;
a shadow region detecting unit which detects a shadow region from the object region image signal; and
an image signal superimposing unit which outputs an image signal detected by superimposing the shadow region detected by the shadow region detecting unit onto the object region image signal detected by the object region detecting unit,
wherein the object region is a face region, and
the shadow region detecting unit detects a blur image signal from the object region image signal, detects a skin tone mask from the blur image signal, detects a shadow region mask by using the blur image signal, the skin tone mask, and an average brightness level of the object region, and outputs the shadow region mask as the shadow region.

17. The photographing apparatus of claim 16, wherein the shadow region detecting unit detects the blur image signal by using a low pass filter, detects the skin tone mask by using an RGB filter threshold algorithm, and detects a region having a brightness level equal to or lower than the average brightness level of the object region, as the shadow region.

18. The photographing apparatus of claim 17, wherein the shadow region detecting unit detects the shadow region mask by performing an intersection calculation on the blur image signal, the skin tone mask, and the brightness level equal to or lower than the average brightness level.

* * * * *